United States Patent [19]

Ferrand et al.

[11] Patent Number: 4,497,394
[45] Date of Patent: Feb. 5, 1985

[54] PISTON HAVING VALVES FOR A DAMPER

[75] Inventors: Michel Ferrand, Montbeliard; Maurice Durupt, Bavans, both of France

[73] Assignee: Automobiles Peugot/Automobiles Citroen, France

[21] Appl. No.: 416,023

[22] Filed: Sep. 8, 1982

[30] Foreign Application Priority Data

Sep. 23, 1981 [FR] France ................. 81 17908

[51] Int. Cl.³ .............. F16F 9/34; F15B 15/22
[52] U.S. Cl. ...................... 188/322.15; 92/9; 92/143; 188/282; 188/322.18
[58] Field of Search ............... 92/8, 9, 143; 188/282, 188/322.15, 322.18, 317; 91/422; 277/216; 137/493.8, 512.1

[56] References Cited

U.S. PATENT DOCUMENTS

| | | | |
|---|---|---|---|
| Re. 16,582 | 4/1927 | Morinelli | 188/317 |
| 1,455,265 | 5/1923 | Rabb | 188/317 |
| 1,457,122 | 5/1923 | Ree | 188/282 |
| 2,877,071 | 3/1959 | Arnot | 277/216 |
| 2,986,125 | 5/1961 | Young et al. | 91/422 |
| 3,139,008 | 6/1964 | Haanes | 91/422 |
| 4,050,359 | 9/1977 | Mayer | 92/143 |
| 4,085,925 | 4/1978 | Peddinghaus et al. | 188/282 |
| 4,359,229 | 11/1982 | Cattaneo | 277/216 |
| 4,418,802 | 12/1983 | Fukushima et al. | 188/322.15 |

Primary Examiner—Robert E. Garrett
Assistant Examiner—H. Edward Li
Attorney, Agent, or Firm—Burns, Doane, Swecker & Mathis

[57] ABSTRACT

The piston comprises, fixed on a rod (9), a central element constituted by a thin perforated disc (8), and two lateral elements (6, 7) in which are provided valve members (21, 22) which cooperate with seats defined by the disc (8). The piston (1) is guided in a cylinder (2) by a ring (16) carried by the lateral elements (6, 7).

7 Claims, 3 Drawing Figures

PISTON HAVING VALVES FOR A DAMPER

The invention relates to hydraulic dampers comprising a piston which slides in a cylinder divided by the piston into two chambers containing liquid, the piston being provided with a plurality of passages capable of putting the two chambers into communication with each other, each passage being closed by a valve member which opens when the piston slides in one of the two directions, and permits a restrained flow of the liquid from one chamber to the other.

The piston usually comprises a central body and two lateral elements termed limiters which are fixed to a piston rod coaxial with the cylinder, the elements carrying the valves and being disposed axially on each side of the body. The latter comprises a cylindrical periphery which guides the body in the bore of the cylinder and two surfaces perpendicular to the axis of the cylinder. Passages extend through the body and each open onto the two surfaces by way of circular orifices. Each lateral element has a periphery spaced from the bore of the cylinder and apertures aligned with those of the body extend therethrough. Each aperture contains a coil spring which biases a circular valve member against the wall constituting a seat of one of the orifices of the body. The distance between each valve member and its seat is limited by the abutment of the valve member against a support surface of the limiter.

The advantage of such pistons is to permit a precise adjustment of the limitation or restraint of the flow, and consequently of the damping characteristic, in each direction of displacement of the piston by suitably dimensioning each valve spring and each spacing between the support surfaces of the lateral elements and the confronting surface of the body. On the other hand, these pistons have the drawback of being relatively space-consuming in the axial direction owing to the superposition of the body and the two lateral elements. Consequently, for a given cylinder, there is a reduced travel of the piston and its rod which may be insufficient, in particular when it concerns a damper or shock-absorber for an automobile vehicle suspension whose maximum movements must be rather large in order to satisfy requirements of comfort and wide variations in the load.

An object of the invention is to overcome this drawback and to propose a damper piston which is smaller in the axial direction.

The invention provides a piston comprising, fixed on a rod, a central element and two lateral elements which are disposed axially on each side of the central element, the central element and the lateral elements comprising aligned axial passages which are closed by valve members received in the lateral elements and cooperating with seats defined by the central element, wherein the central element is a thin disc whose diameter is less than the maximum diameter of the piston and at least one of the two lateral elements carries a guide ring on its periphery.

According to other features of the invention:

the ring is split and made from a plastics material having a low coefficient of friction;

the two lateral elements comprise on their periphery a cylindrical surface which extends between an end surface adjacent to the central element and a radial shoulder, the guide ring being received in the recess defined by said cylindrical surfaces and said shoulders;

one of the lateral elements is provided with an axially projecting portion which cooperates with an opening in the disc and with a recess in the other lateral element, so as to achieve a relative angular positioning of the disc and the two lateral elements;

the disc is of sheet metal and the closed passages it includes are perforations formed by a punching operation;

in the region of the contour of these perforations, the disc is deformed or notched in such manner as to provide an escape path for the liquid between the seat and the valve member when they are in contact;

the disc comprises at least one additional perforation providing a permanent escape path.

A description will now be given of a particular embodiment of a damper piston according to the invention with reference to the accompanying drawings in which.

Figure 2:
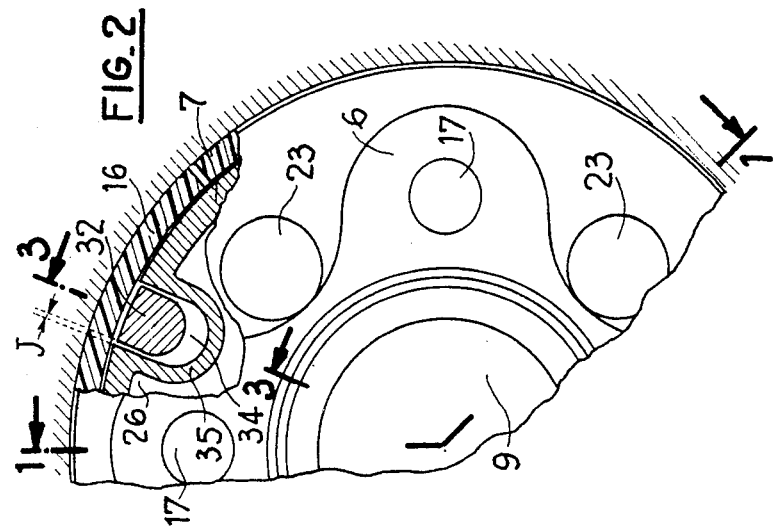
FIG. 2 is a partial left view of FIG. 1 partly cut away and partly in section.

Slidably mounted in the bore 1 of the cylinder 2 of a damper or shock-absorber is a piston 3 which divides the cylinder into two chambers 4, 5 filled with liquid. The piston comprises two lateral elements 6, 7, termed limiters, which are disposed on each side of a central element constituted by a perforated disc 8 and are secured, for example, by a forming-over operation on the end 9a of a rod 9 coaxial with the axis of the cylinder. Each element 6, 7 has on its periphery a cylindrical surface 10, 11 which extends between one end surface 12, 13, adjacent to the disc 8, and a radial shoulder 14, 15. Axially maintained between the two shoulders 14, 15 is a split ring 16 of a plastics material having a low coefficient of friction and having an outer surface which guides the piston in the bore 1. The split of the ring enables the latter to be easily mounted and is provided with a shoulder portion in the known manner so as to prevent the liquid from flowing from one of the chambers 4, 5 to the other. Each element 6, 7 has, extending therethrough in a direction parallel to the axis, two series of apertures: some apertures 17, 18 each containing a coil spring 19, 20 which biases a circular valve member 21, 22 against its seat constituted by the contour of one of the perforations of the disc 8, whereas other apertures, 23, 24, are in confronting relation to the apertures of the first series of the other lateral element. Each aperture 17, 18 has an open end 17a, 18a, which acts as a support for the spring and opens, on the side of the disc, onto a wide annular groove 25, 26 formed in the surface 12, 13 of the limiter. Around each aperture, the end wall 27 of this groove includes a boss 28 or a ledge 29 constituting a support surface parallel to the disc and acting as an abutment for a flange 30 of the valve member when the latter moves away from its seat.

The disc 8 is of thin cut-out sheet metal and includes circular perforations 31 in alignment with the apertures 17, 18 of the elements 6, 7. These perforations are formed directly by a fine punching operation. In order to ensure the correct relative angular positions of the disc and elements 6, 7 and consequently correct alignment of the perforations and the apertures, an axial projecting portion 32 of the element 6 penetrates with an angular clearance J which is small or zero, an opening 33 of the disc and a recess 34 of the element 7. Around the recess, a projecting portion 35 in the groove 26 confronts an equivalent projecting portion 36 in the groove 25 of the element 6 so that the outer contour and the inner contour of the surfaces 12 and 13 of the elements 6, 7 provide a continuous sealed contact with the disc and in particular prevent any escape of liquid from the apertures 23, 24 to the peripheries 10, 11, which would disturb the law of the restraint of the flow of the damper. On the other hand, permanent escape passages may be provided (not shown) either by at least one calibrated conduit extending through a valve member or the disc 8 and possibly the elements 6, 7. This conduit may be, for example, formed by an axial groove in the bore receiving the rod 9 or by an additional perforation of the disc 8, or by a slight deformation of the sheet metal on the contour of at least one perforation 31 which forms a hollow in the corresponding valve sheet, or by cutting a notch in this contour.

Figure 1:
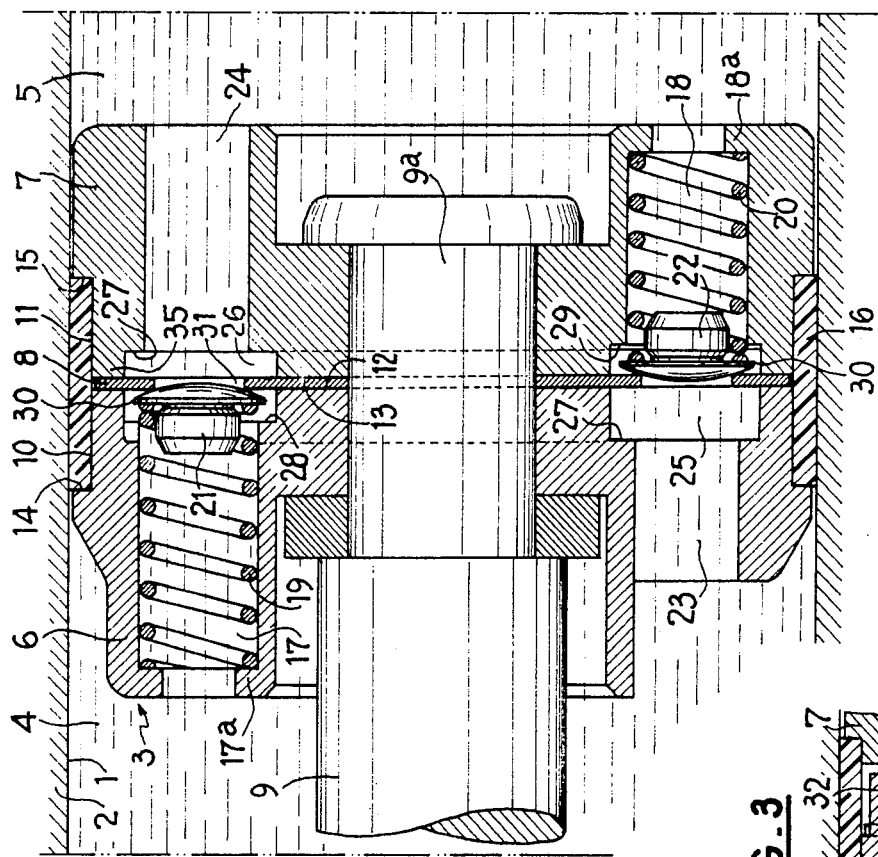
FIG. 1 is an axial sectional view of the piston mounted in the bore of a cylinder, this view being taken along line 1—1 of FIG. 2.
Figure 3:
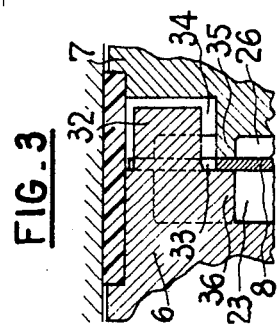
FIG. 3 is a partial sectional view taken on line 3—3 of FIG. 2.

When the piston moves in one direction, for example toward the right as viewed in FIG. 1, the pressure of the liquid of the chamber 5 rises and maintains closed the valve members 22 located on the right side of the disc 8 and shifts the valve member 21 located on the left side. Each valve member 21 moves away from its seat and compresses the corresponding spring and allows liquid to flow from the chamber 5 to the chamber 4 when the speed of the sliding of the piston reaches a given value. The raising, i.e. the separation of the valve member from its seat, becomes maximum when its flange 30 abuts against the support surface 28 and produces a given restraint or retarding action on the flow. In order to ensure that this restraint varies with the speed of sliding of the piston in accordance with a desired law for the damper, the various valve members are associated with springs which are calibrated differently and the spacing between the flanges 30 of the various valve members and the corresponding support surfaces 28, 29 may differ and consequently the maximum rising of the valve members off their seats may also differ and produce various restraints on the flow.

By way of a modification, the ring 16 is carried by the periphery of a single lateral element, the ring being retained axially in this case on the side opposed to the shoulder, such as 14, either by the contour of the other limiter or by the contour of the disc, which is then made slightly larger than in the preceding case.

The proposed piston is not only short in axial length relative to the existing pistons of the same type, but is lighter. This is particularly advantageous in the case of dampers employed on automobile vehicles. It is moreover cheaper, in particular owing to the simplicity of manufacture of the valve seats without a machining operation.

Having now described our invention what we claim as new and desire to secure by Letters Patent is:

1. In a piston structure for in particular a damper, the piston structure comprising a rod, a central element fixed on the rod and two lateral elements fixed on the rod axially on opposite sides of the central element, the central element, the lateral elements and the rod being coaxial, the central element and the lateral elements being distinct elements in axially adjoining relation defining aligned passages axially in the extension of one another and circumferentially spaced apart, valve members for closing the passages and received in the lateral elements and respectively cooperative with valve seats defined by the central element on opposite sides of the central element; the improvement wherein the central element is a thin disc clamped between the two lateral elements and having a diameter which is less than a maximum diameter of the piston structure and at least one of the two lateral elements carries a guide ring on the periphery of said one lateral element for guiding sliding contact with a cylinder in which the piston structure is intended to operate.

2. A piston structure according to claim 1, wherein the guide ring is split and made from a material having a low coefficient of friction.

3. A piston structure according to claim 1, wherein each lateral element defines on the periphery thereof a radial shoulder and a cylindrical surface which extends between the radial shoulder and an end surface of the lateral element, which end surface is adjacent to the disc, said cylindrical surfaces having a diameter greater than the diameter of the disc and the guide ring being received in a recess defined by said cylindrical surfaces and said radial shoulders.

4. A piston structure according to claim 1, wherein one of the lateral elements defines on the periphery thereof a radial shoulder and a cylindrical surface which extends between the radial shoulder and an end surface of said one lateral element, said end surface being adjacent to the disc, the disc has a diameter smaller than the diameter of the cylindrical surface, and the guide ring is received in a recess defined by said cylindrical surface, said shoulder and the disc, the disc having at least one additional passage providing a permanent escape path for the liquid.

5. A piston structure according to any one of the claims 1 to 4, wherein the disc and the lateral elements comprise complementary interpenetrating portions which angularly position the disc and elements relative to one another.

6. A piston structure according to claim 1, wherein the disc is of sheet metal and the passages are produced by a punching operation.

7. A piston structure according to any one of the claims 1 to 4, wherein a continuous seal contact exists between the disc and the lateral elements in a region located radially between the passages and the periphery of the disc.

* * * * *